United States Patent
Bruno et al.

(10) Patent No.: US 6,538,601 B2
(45) Date of Patent: Mar. 25, 2003

(54) HYBRID SYSTEM FOR POSITION DETERMINATION BY A MOBILE COMMUNICATIONS TERMINAL

(75) Inventors: Ronald C. Bruno, Arlington, VA (US); Leonard Schuchman, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/880,807

(22) Filed: Jun. 15, 2001

(65) Prior Publication Data

US 2002/0135510 A1 Sep. 26, 2002

Related U.S. Application Data

(60) Provisional application No. 60/271,764, filed on Feb. 27, 2001.

(51) Int. Cl.⁷ .............................. H04B 7/185; G01S 5/02
(52) U.S. Cl. ...................... 342/357.1; 342/458
(58) Field of Search .................... 342/357.06, 357.1, 342/118, 458; 701/213, 215

(56) References Cited

U.S. PATENT DOCUMENTS

| | | | |
|---|---|---|---|
| 4,445,118 A | 4/1984 | Taylor et al. | |
| 5,311,194 A | * 5/1994 | Brown | ........................ 342/357 |
| 5,365,450 A | 11/1994 | Schuchman et al. | |
| 5,398,034 A | 3/1995 | Spilker, Jr. | |
| 5,604,765 A | 2/1997 | Bruno et al. | |
| 6,111,538 A | 8/2000 | Schuchman et al. | |
| 6,161,016 A | 12/2000 | Yarwood | |
| 6,268,824 B1 | * 7/2001 | Zhodzishky et al. | ... 342/357.04 |

OTHER PUBLICATIONS

Global Positioning Systems, Papers Published in Navigation, vol. 1, Spilker, Jr., J.J., GPS Signal Structure and Performance Characteristics, pp. 29–54, 1980.
Global Positioning System, Papers Published in Navigation, vol. 1, Van Dierendonck, A.J. et al., The GPS Navigation Message, pp. 55–73, 1980.

* cited by examiner

*Primary Examiner*—Dao Phan
(74) *Attorney, Agent, or Firm*—Edell, Shapiro, Finnan & Lytle, LLC

(57) ABSTRACT

A mobile unit includes a network receiver, such as a GSM telephone, for communication with a wireless network, and a navigation receiver, such as a global positioning system (GPS) receiver for receiving navigation signals. The navigation receiver includes a vector delay lock loop (VDLL) that receives information concerning the navigation sources, such as satellite data messages, transmitted over a common broadcast channel of the wireless network, and receives navigation signals from the navigation receiver. The VDLL uses the navigation signals received from navigation sources that are not obscured and uses satellite data messages broadcast over the wireless network to track a navigation signal that is received only intermittently due, for example, to the navigation source being obscured from view of the mobile unit.

27 Claims, 8 Drawing Sheets

FIG.3 *PRIOR ART*

HYBRID SYSTEM FOR POSITION DETERMINATION BY A MOBILE COMMUNICATIONS TERMINAL

This application claims benefit of provisional application 60,271,764 filed Feb. 27, 2001.

BACKGROUND OF THE INVENTION

1. Field of the Invention

The invention relates to communication and navigation systems. More particularly, it relates to mobile communications systems with satellite and terrestrial navigation features.

2. Description of the Related Art

Satellite-based navigation systems, such as the Global Positioning System (GPS), allow for accurate navigation almost anywhere in the world. A constellation of GPS satellites surrounds the earth in three different planes with the satellites orbiting the earth every 12 hours. The orbit of each satellite is closely monitored and its position is precisely known. Each GPS satellite transmits navigation signals, each signal being modulated with at least one pseudo-random noise (PN) code, or a portion of a PN code, unique to the satellite. Each GPS satellite uses a very stable frequency reference for generating the satellite's signals. Also modulated onto the navigation signals is a satellite data message (SDM) with a bit rate of 50 bits/second, which is much slower than the chipping rate of the PN code. The signal structure of the GPS satellites is described in further detail in Spilker, Jr., J. J. "GPS Signal Structure and Performance Characteristics," Global Positioning System, Papers Published in Navigation, The Institute of Navigation, Washington, D.C., 1980, which is incorporated by reference herein for all purposes.

Using a GPS receiver with an unobstructed view of the sky a person can determine his or her position within a few meters. In order to determine its position in three dimensions, and to determine time precisely, the receiver must receive navigation signals from at least four satellites, as shown in FIG. 1. Here, a mobile unit (MU) can determine its position (x, y, z) and time by determining its distance from four sources, in this case four GPS satellites (10-1, 10-2, 10-3 and 10-4), at known positions (($x_1$, $y_1$, $z_1$), ($x_2$, $y_2$, $z_2$), ($x_3$, $y_3$, $z_3$), ($x_4$, $y_4$, $z_4$)). A conventional GPS receiver is shown in FIG. 2. It includes an antenna 20, a front end 30 for converting the received signals into digital signals in a form suitable for processing, an array of delay lock loop (DLL) circuits 40 and a Kalman filter estimator 50 for estimating the receiver's position. Each DLL circuit outputs a pseudo-range measurement ($PR_1$ through $PR_n$, respectively) to a summation unit (units $51_1$ through $51_n$) in the Kalman filter estimator 50. Each summation unit combines the latest pseudo-range measurement from the DLL with the Kalman filter's estimate of the receiver's position x(t) and provides the combined signal to a vector estimation unit 52. The vector estimation unit 52 uses the outputs of the summation unit to update the Kalman filter's estimate of the receiver's position and outputs a position vector x^(t).

A schematic diagram of each of the delay lock circuits ($DLL_1$ through $DLL_n$) is shown in FIG. 3, shown here as a coherent DLL, although a non-coherent DLL also can be used. Each DLL circuit includes a local PN code generator 65 that generates the same PN codes broadcast by the GPS satellite the DLL circuit is tracking. The conventional receiver also includes an early correlator 60E and a late correlator 60L that correlate the received signal (i.e., the satellite signal A(t) at t=τ, plus noise n(t)) with an early and late versions of the locally generated PN code $S_0$(t). As shown in FIG. 3 the early version of the PN code is advanced by half a PN chip period T (i.e., +T/2) and the late version is delayed by half a PN chip period (i.e., −T/2). The early and late correlation signals are each filtered by low pass filters 61E and 61L, respectively. The filtered signals are combined using combiner 62 and the resultant signal is filtered by loop filter 63. The output of loop filter 63 is a control signal that controls a number controlled oscillator (NCO) 64. The NCO generates a number, based on the control signal from loop filter 63, that causes the PN generator 65 to output its PN sequence either faster or slower depending on which of the early and late correlators outputs a stronger signal. The DLL circuit tracks the code in the received signal and a time measurement, called a pseudo-range measurement, is made. The measured pseudo-range is a measure of the signal propagation time between the satellite and the receiver.

Upon acquiring the satellite signal, the receiver demodulates the SDM from that received signal. The SDM includes satellite ephemeris information concerning the orbits and positions of each satellite, and satellite time model information concerning the satellites' clocks. A receiver uses this information in combination with the measured pseudo-ranges to determine the receiver's position by calculating a navigation solution.

The SDM is 900 bits long and is broadcast every 30 seconds at 50 bits/second. Accordingly, a GPS receiver can receive and store the SDM if it is able to receive a satellite's signal continuously for the amount of time the SDM is broadcast, and during the period that the satellite broadcasts the SDM. Also modulated onto the navigation signal at 50 bits/second is the GPS almanac: a 15,000 bit block of coarse ephemeris and time mode data for the entire GPS constellation. The receiver needs this course data to assist in its acquiring a GPS satellite signal. Receiving the GPS almanac can take at least 12 ½ minutes of listening to a single GPS satellite to receive the almanac data.

Other methods of delivering the SDM and GPS almanac data are known. For example, U.S. Pat. No. 5,365,450, incorporated by reference herein for all purposes, describes delivering the SDM via a cellular telephone system to shorten the time required to acquire a GPS satellite. There, a person wanting to rapidly acquire a GPS navigation signal uses a cellular telephone network to request the SDM. The cellular network stores the current ephemeris and time models of the GPS satellite constellation in a GPS satellite almanac database. Upon receiving the request the cellular telephone system responds to the request by sending the requested data over an independent data link. The receiver then uses that data to acquire a GPS satellite signal. However, this system relies on the receiver having an unobscured view of the GPS satellites to continuously track the satellites. Such an unobscured view is not always available to a user, particularly a mobile user.

Certain environments can obstruct the view of the sky. A prime example is the so-called "urban canyon" where tall buildings densely concentrated in an urban setting obscure significant portions of the sky and block the GPS satellite signals preventing their reception. One way to track GPS satellites in an obscured environment is to use a vector delay lock loop described in U.S. Pat. No. 5,398,034, incorporated by reference herein for all purposes. A vector DLL improves over a conventional delay lock loop by using the receiver's estimated position vector (x, y, z and time) to control the local PN code generator, rather then using the correlator output as in a conventional DLL circuit. The vector DLL can use measurements from a variety of sources in computing the receiver's position vector. These sources could include signals from all GPS satellites visible to the receiver, signals from other visible navigation satellites such as satellites in the former Soviet Union's GLONASS system, and even signals from ground-based navigation transmitters such as so-called "pseudolites" that transmit a GPS-like navigation signal from a known, fixed location. A conventional vector DLL is shown in FIG. 4, and is similar to the receiver shown in FIG. 2, but also contains a H(x) transformation unit 70 that transforms the estimated position information into control signals for controlling the DLLs.

Other techniques for providing navigation signals in environments with obstructed visibility of the sky include embedding navigation beacons in communication signals within a cellular telephone system base station, as described in U.S. Pat. No. 5,604,765, incorporated by reference herein for all purposes. There, the navigation signals are transmitted from a base station either in a standalone or overlay mode where the signal level of the navigation signals is kept below the tolerable noise level of the communications signals. Included in the navigation signal is information identifying the base station and the base station's location (e.g., base station latitude and longitude). U.S. Pat. No. 6,111,538, incorporated by reference herein for all purposes, describes how a set of spread spectrum navigation beacons, such as those described above, can be designed and arranged in a cellular pattern, and how the required navigation receiver signal processing can be efficiently integrated into a cellular telephone.

A mobile unit equipped with a GPS receiver having a vector DLL must receive updates to the satellite data messages transmitted by the satellites that the receiver is tracking in order to generate accurate position estimates. When the mobile unit is traveling where visibility to the open sky is intermittent at best, it may be able to receive a satellite signal only for brief periods. The vector DLL circuit allows the receiver to continue to track a satellite even during brief interruptions to the signal due to the signal being obscured. However, if the signal is received intermittently for only brief periods, the receiver may not be able to retrieve the SDM during those brief periods when it receives the GPS signal. Accordingly, the receiver may not be able to acquire the information it needs from the satellite data message, or it may have a satellite message that is stale and in need of being refreshed. The receiver also may not have enough storage to hold the satellite data messages for all satellites being tracked. Accordingly, there is a need to provide a GPS receiver with current satellite data messages and GPS almanac data for use with a vector delay lock loop, regardless of the amount of time a GPS signal is available to the receiver. Such capabilities are needed for the vector delay lock loop to operate more accurately and with fresher data than when operating with conventional systems.

SUMMARY OF THE INVENTION

Therefore, in light of the above, and for other reasons that will become apparent when the invention is fully described, an object of the invention is to enable a receiver to obtain information concerning the location of a source of a navigation signal even when the receiver is not receiving the navigation signal, and track that source even when the navigation signal is only intermittently received.

Another object of the invention is to use the information concerning the location of the navigation beacon with a vector delay lock loop circuit to enable the receiver to continue to accurately track the navigation beacon when the navigation beacon is received intermittently. In a system in which a mobile terminal may receive multiple navigation signals from different sources, including GPS and signals transmitted from cellular base stations, it is important to have an algorithm that is robust in that it computes a best estimate of position based upon the available signals. In addition, since in many terrestrial environments the signals are intermittent due to blockage, it is important to have an algorithm in which all navigation signals are cooperatively tracked. As a result, the estimate of the mobile terminal's position is more robust, as long as the minimum number (e.g., four) of navigation signals is received at least intermittently, because blockage of the navigation signal does not prevent the circuit from obtaining the position information of the satellite and terrestrial navigation sources.

Yet another object of the invention is to transmit data concerning the position of a source of a navigation signal, such as a GPS satellite, using a common broadcast control channel of a cellular telephone network. The data is for use by a vector delay lock loop circuit in tracking the navigation signal when it is only intermittently received. The data is also used to allow for rapid reacquisition of a formerly blocked navigation signal by enabling the vector delay lock loop circuit to maintain a running estimate of the signal delay even for blocked signals.

Still another object of the invention is to enable a mobile terminal to use a vector delay lock loop circuit to determine its position from a set of signals that may be transmitted by earth orbiting satellites, such as GPS satellites, or by terrestrial based cellular base stations, or a combination of satellite and terrestrial based stations, in which information concerning the position of the satellites or terrestrial stations is obtained from a cellular common broadcast channel.

Still another object of the invention is to use the communication signals in a cellular telephone network as a navigation signal. According to one aspect of the invention this can be accomplished by receiving a GPS signal at a cellular base station, and using the GPS signal to provide frequency and time references for controlling the characteristics of the cellular communications signals.

DETAILED DESCRIPTION

Figure 1:
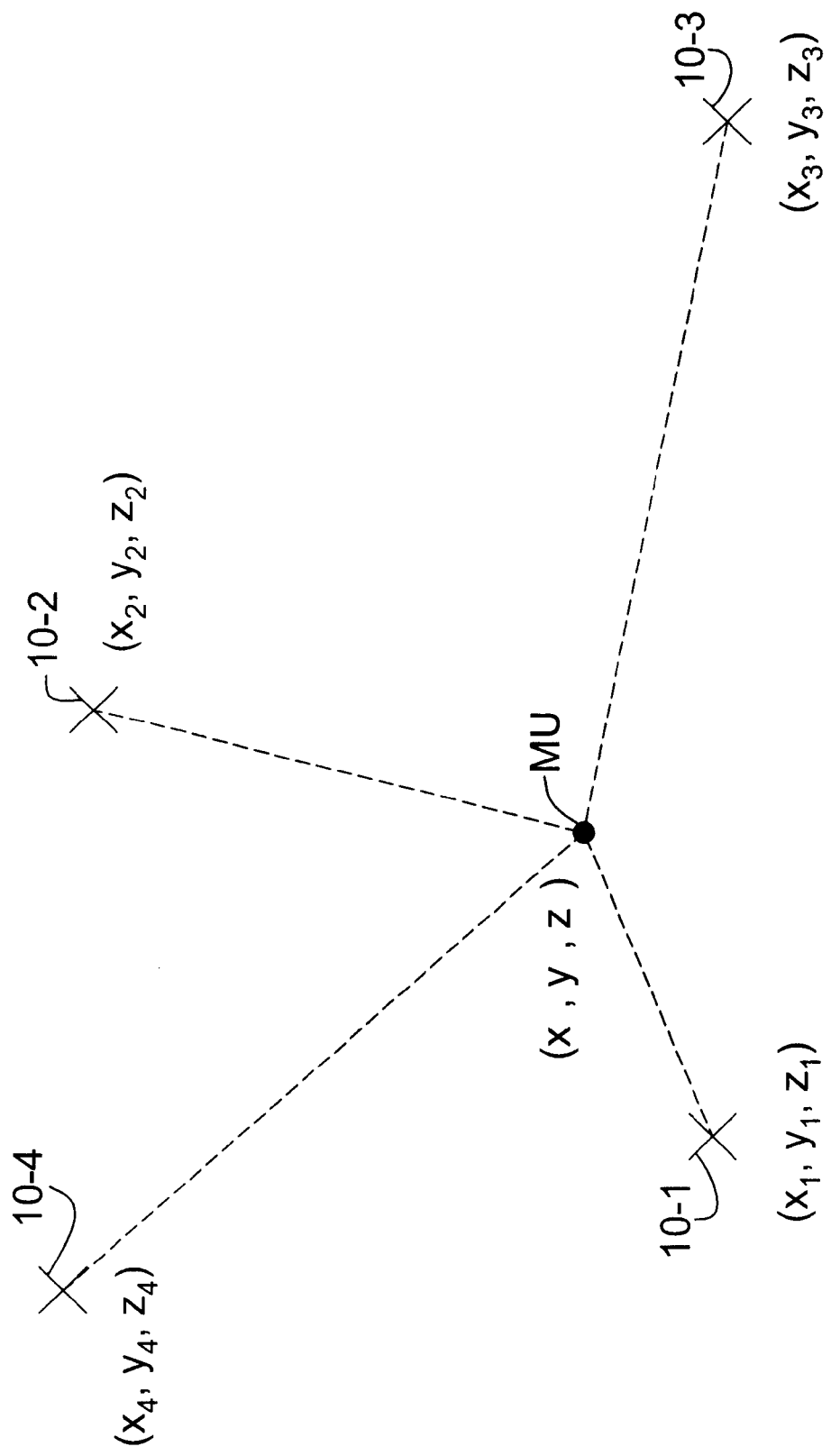
FIG. 1 is a diagram depicting a spatial relationship between a mobile unit and four sources of navigation signals.
Figure 2:
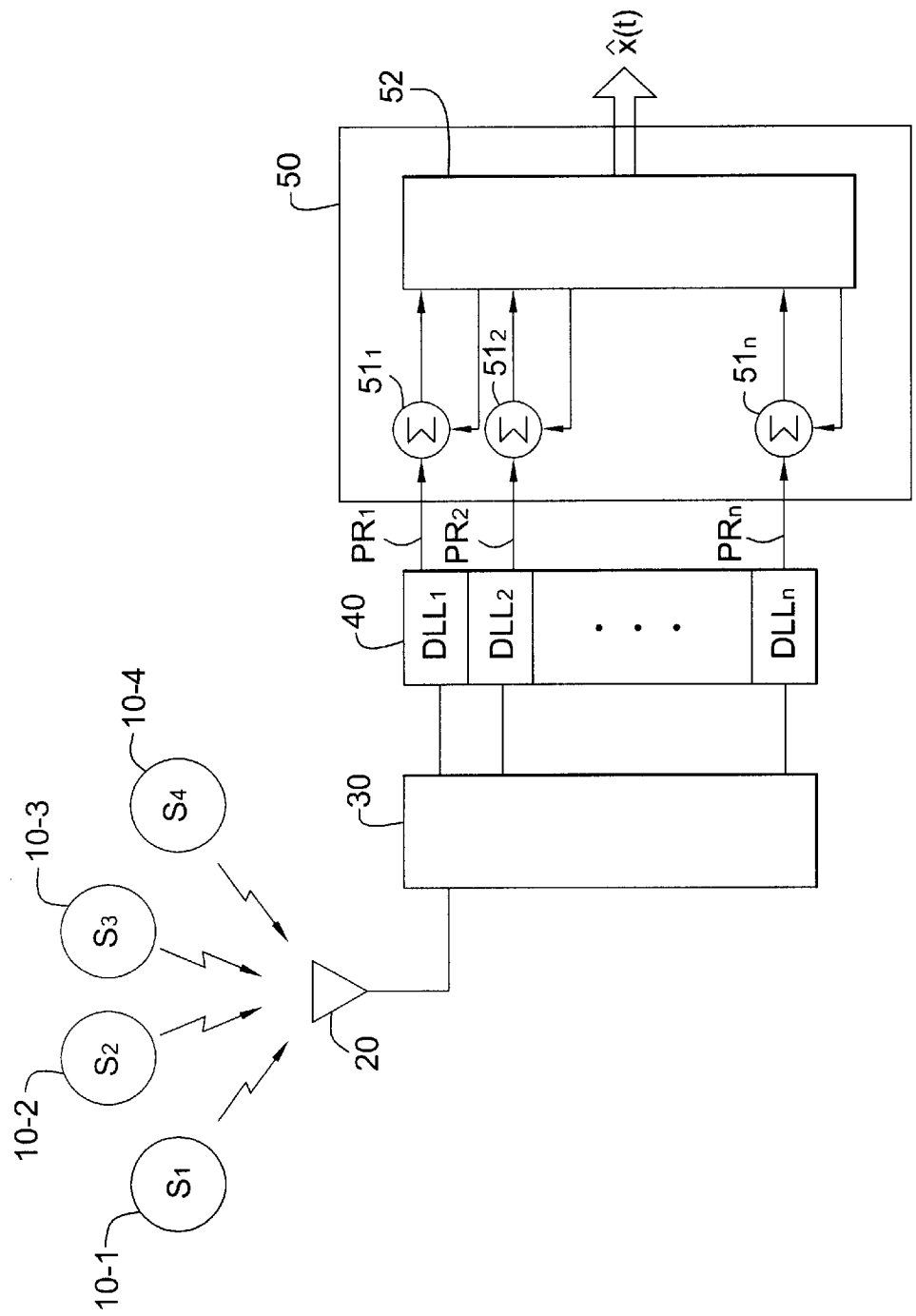
FIG. 2 is a schematic diagram of a conventional GPS receiver.
Figure 3:
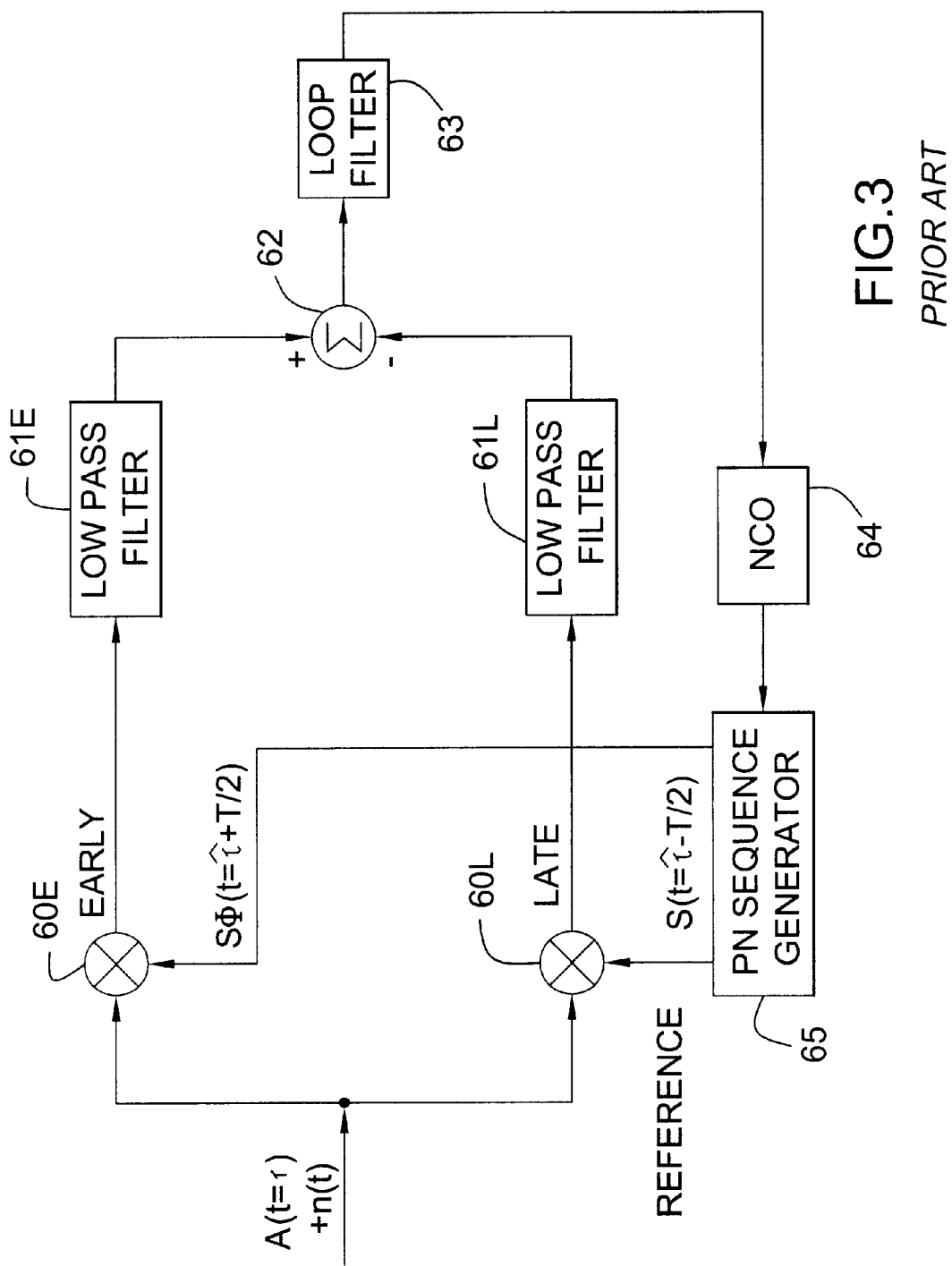
FIG. 3 is a schematic diagram of a conventional coherent delay lock loop circuit.

Preferred embodiments according to the present invention are described below with reference to the above drawings, in which like reference numerals designate like components.

Broadcast of SDM Data for Use with Vector Delay Lock Loop

Figure 4:
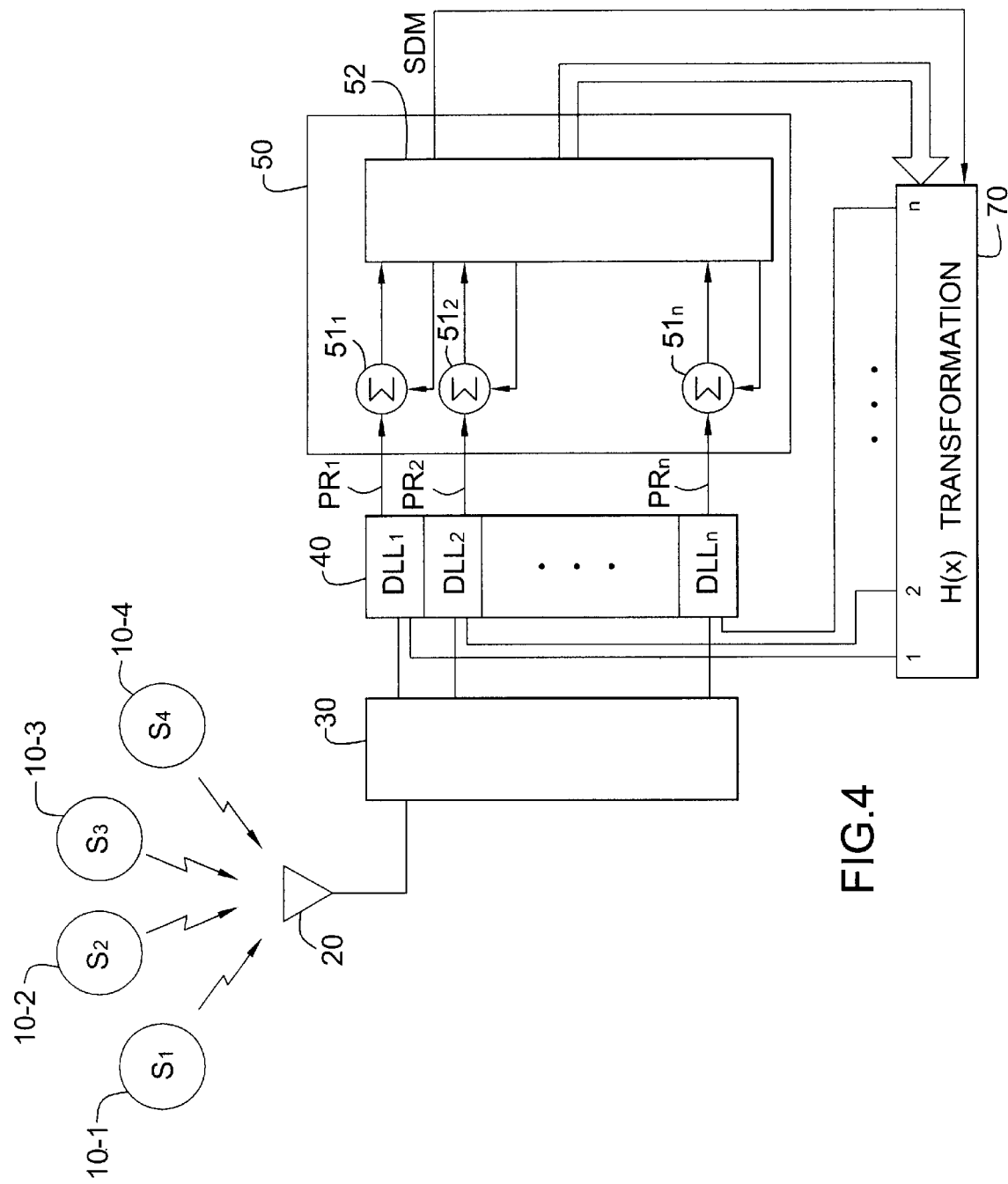
FIG. 4 is schematic diagram of a conventional GPS receiver using a vector delay lock loop circuit.
Figure 5:
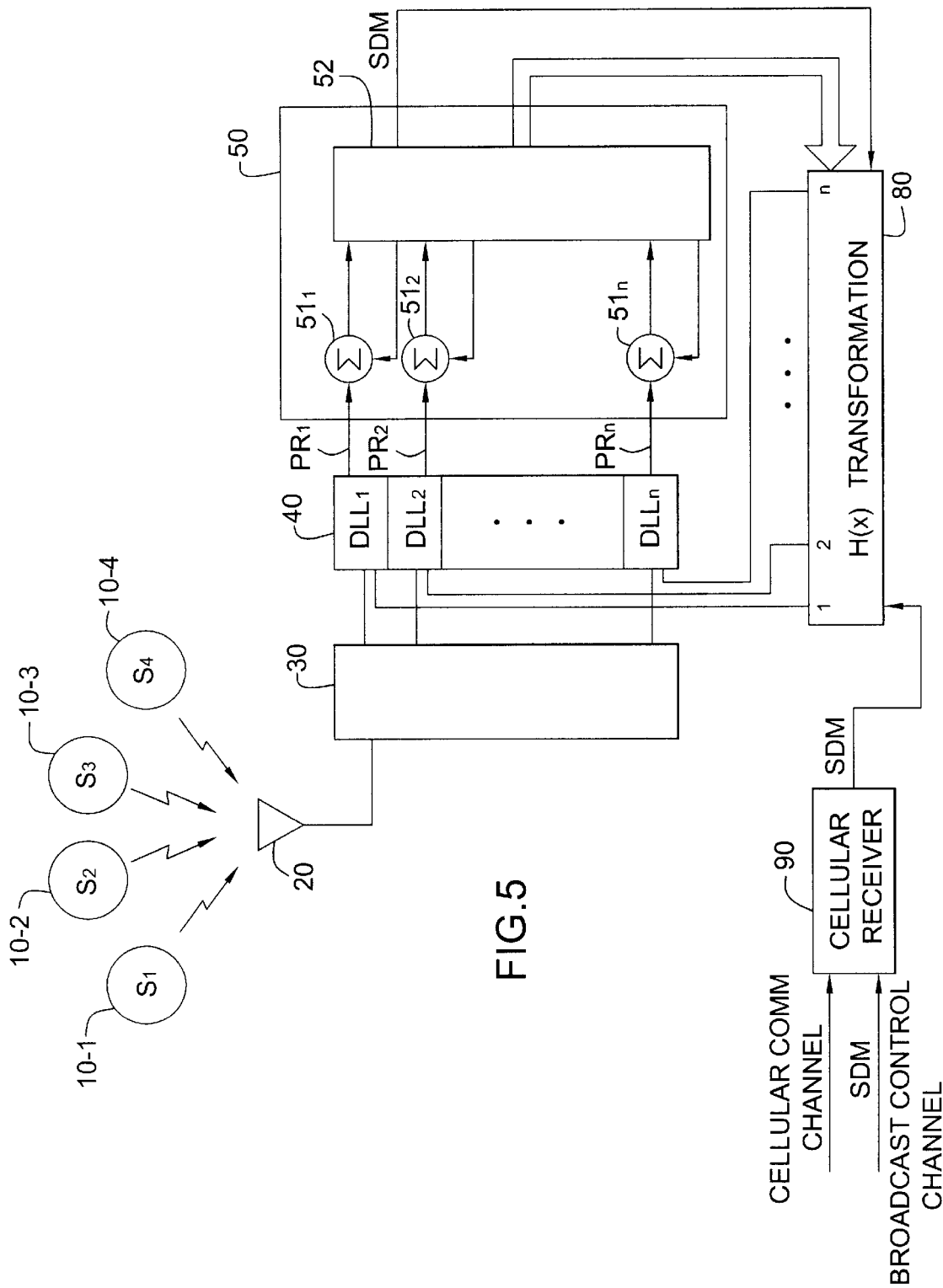
FIG. 5 is a schematic diagram of a GPS receiver using a vector delay lock loop circuit with an input SDM message received from a cellular communications system.

A hybrid position determination system is shown schematically in FIG. 5. The system shown in FIG. 5 is similar to the vector delay lock loop system shown in FIG. 4, except it includes a modified H(x) transformation unit 80. The modified transformation unit 80 receives satellite data messages and GPS almanac information from the received GPS signal, as in the conventional vector delay lock loop system, and it also receives the SDM and GPS almanac data separately from a cellular receiver 90. The SDM and GPS almanac data received on a broadcast control channel by way of the cellular receiver 90 are input to the H(x) transformation unit 80, and are used by the vector delay lock loop whenever the SDM and GPS almanac data are not available from the satellite signal, or even if they are available from the satellite signal.

By providing the SDM and GPS almanac data to H(x) transformation unit 80 through the cellular communication system, that data is available for the receiver's use more often than in the conventional vector delay lock loop system.

The satellite data message (SDM) for each GPS satellite is 900 bits long and is transmitted from the satellite every 30 seconds at a rate of 50 bits/second. The GPS almanac data is 15,000 bits long and it too is transmitted at 50 bits/second. If the receiver cannot receive the satellite's signal during the time it transmits its SDM, the receiver must wait another 30 seconds for the satellite to again transmit the SDM. In situations where GPS signals can be received only intermittently, the receiver may not be able to receive the SDM for a satellite it is tracking. Although the vector delay lock loop allows a receiver to continue tracking when the satellite's navigation signal is only intermittently received, if the SDM cannot be received the quality of the vector delay lock loop tracking will be diminished. Accordingly, the receiver of FIG. 5 by receiving the SDM by way of the cellular network, allows the vector delay lock to accurately track a GPS satellite signal that is only intermittently received.

Figure 6:
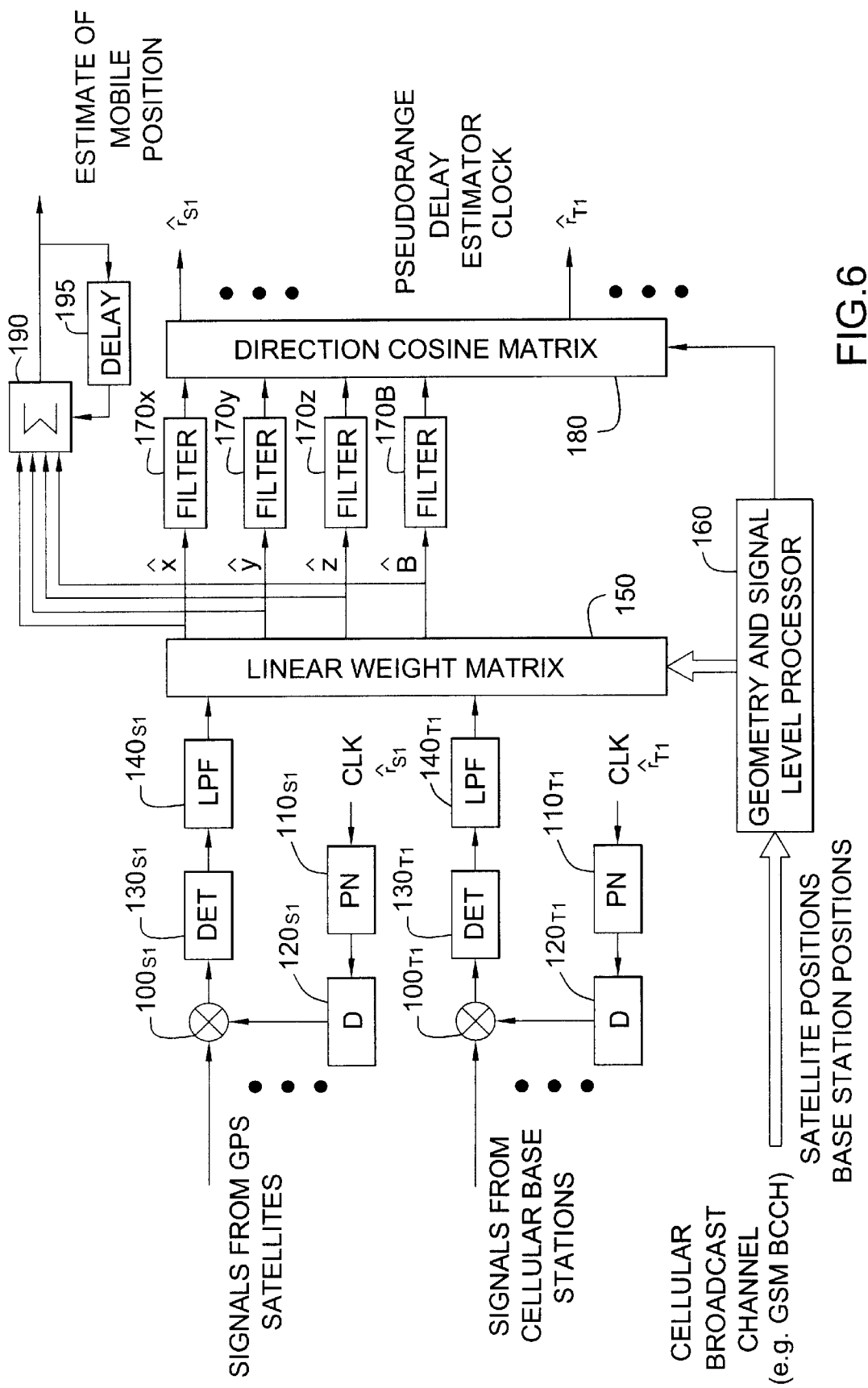
FIG. 6 is a schematic diagram of a vector delay lock loop circuit used in the receiver of FIG. 5.

A more detailed schematic representation of a mobile terminal employing a vector delay lock loop circuit is shown in FIG. 6. The vector delay lock loop circuit here does not require a demodulator for extracting satellite navigation data from the navigation signals received from the GPS satellites. Rather, the mobile terminal obtains the required navigation data from the cellular broadcast channel. As shown in FIG. 6 the mobile terminal can receive signals from GPS satellites, such as signals S1 from a first satellite, S2 from a second satellite, as so forth. The received signals are directed to a correlator (e.g., $100_{S1}$) of a delay lock loop circuit. The delay lock loop circuit also includes a pseudonoise (PN) code generator $110_{S1}$, driven by a clock signal CLK. The clock signal can be the output of an NCO circuit that is controlled by a pseudo-range estimate (e.g., $r_{S1}$) for the satellite being tracked. The DLL circuit also includes a detector $130_{S1}$ that receives the output of the correlator. A low pass filter (LPF) $140_{S1}$ filters the output of the detector and outputs a pseudo-range measurement for the satellite that the delay lock loop is tracking.

The vector delay lock loop of FIG. 6 also processes other navigation signals other than GPS satellite signals, such as navigation signals transmitted from a terrestrial based source. For example, the mobile terminal can receive navigation signals embedded in communication signals transmitted from a cellular network's base station, as shown in FIG. 6. Here, a delay lock loop includes a correlator $100_{T1}$, a pseudonoise generator $110_{T1}$ driven by a clock controlled by an NCO that is controlled by the pseudo-range estimate $r_{T1}$ for the terrestrial based navigation station, a detector $130_{T1}$ and a LPF $140_{T1}$. This delay lock loop produces a pseudo-range measurement for the terrestrial based navigation station; in this case a cellular base station.

The pseudo-range measurements are input to a linear weight matrix 150 that determines the weight to give to each pseudo-range measurements based upon the navigation data for the source of the navigation signal. The linear weight matrix uses a satellite's data message delivered over the common broadcast channel of the cellular communication network in assigning a weight to the pseudo-range measurement for that satellite. Similarly, the linear weight matrix uses the navigation data for the base station that transmits the navigation signal being processed in weighting the pseudo-range measurements for that base station.

A geometry and signal level processor 160 receives from the cellular broadcast control channel the satellite position information from the SDMs broadcast for each satellite, and the base station position information for base stations in the vicinity that are transmitting navigation beacons. The geometry and signal level processor 60 uses the satellite and base station position information in assigning weights to the pseudo-range measurements.

The weighted position measurements (x, y, z) and a weighted measure of time bias (b) represent the estimate of the mobile terminal's position and time bias, and are output from the linear weight matrix, filtered by filters 170x through 170b, and applied to a direction cosine matrix 180. The direction cosine matrix 180 uses these weighted measurements and the satellite and terrestrial position and clock information provided via the broadcast control channel to calculate the pseudo-range estimates of the satellite and terrestrial transmitters, $r_{S1}$ and $r_{T1}$, respectively. The pseudo-range estimates are used to control the vector delay lock loops' pseudonoise generators as described above.

The position and clock bias estimates are also input to a summation unit 190 that sums the estimates with prior estimates using a delay circuit 195, to output an estimate of the mobile terminal's position, as shown in FIG. 6.

Figure 7:
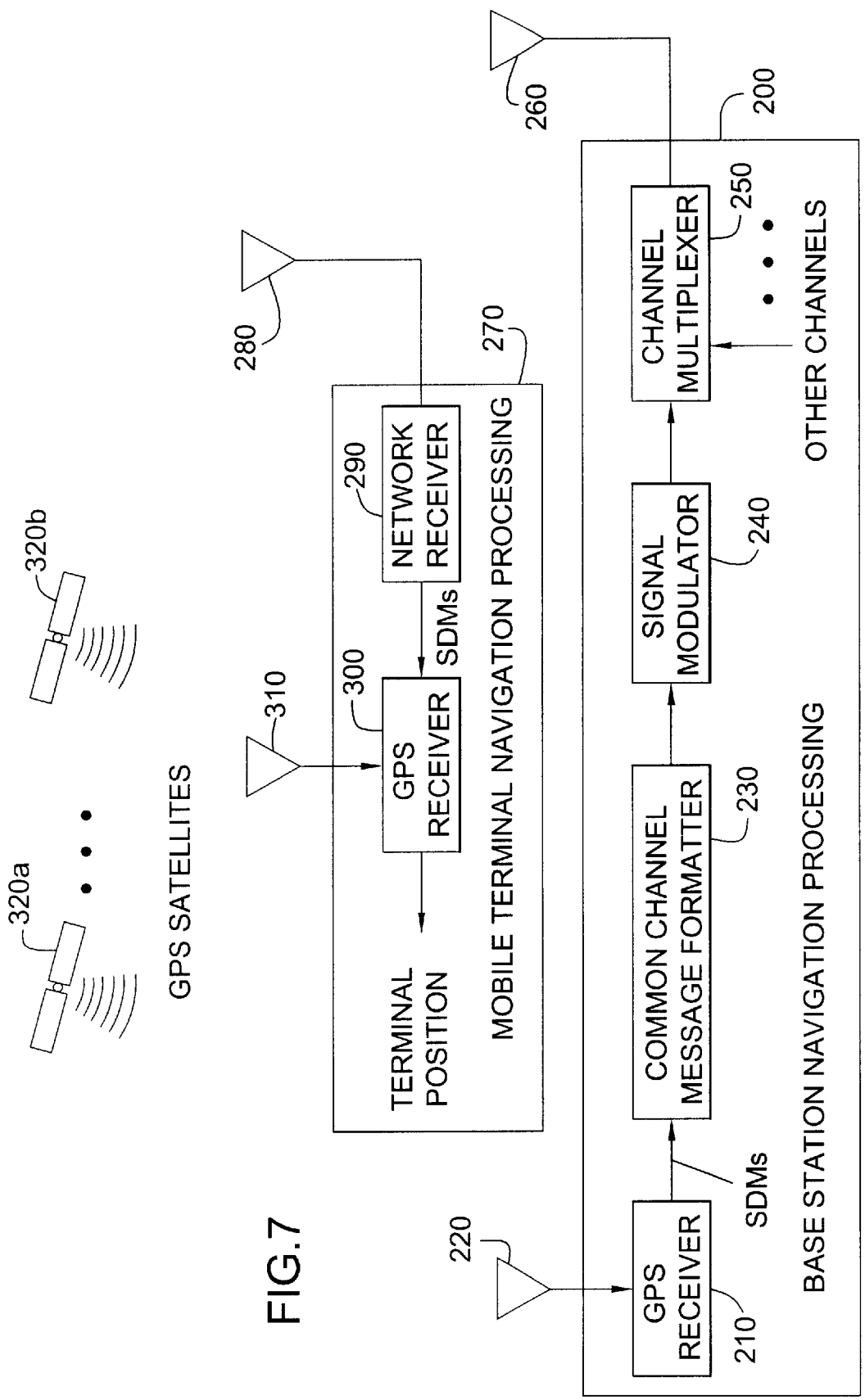
FIG. 7 is a schematic diagram of a hybrid position determination system having a base station navigation unit for receiving GPS signals and broadcasting satellite data messages over a broadcast control channel to mobile terminals.

A hybrid position determination system for delivering the SDM via a cellular communication system is shown in FIG. 7. A cellular network base station 200 includes a GPS receiver 210 connected to a GPS antenna 220 for receiving signals from GPS satellites. The base station is likely located with an unobscured view of the sky and therefore can receive the GPS satellite signals. The GPS receiver 210 receives the GPS satellite signals and extracts the SDM from each of those signals. It sends the SDMs to a common channel message formatter 230 to format the SDM data for delivery over a broadcast control channel of the cellular communications network. The formatted SDMs are sent to a signal modulator 240 for modulation onto a cellular signal. The modulated signal is multiplexed by channel multiplexer 250 with signals from other channels for transmission over an antenna 260 on a channel of the cellular communication system. Preferably, the SDMs are broadcast over a broadcast control channel to allow any mobile terminal in the base station's vicinity to receive the SDM data.

A mobile terminal 270 includes a cellular communication system antenna 280 that receives the cellular signals and routes them to a network receiver 290. The network receiver 290 monitors the broadcast control channel and extracts the SDM from that channel. The network receiver 290 sends the extracted SDMs to the vector delay lock loop in a GPS receiver 300. The GPS receiver 300 is connected to a GPS antenna 310 to receive signals from the GPS satellites, such as satellites 320a and 320b. In the event the signals from the satellites 320a and 320b are intermittently blocked, due to their being obscured, the GPS receiver 300 uses the SDM broadcast by base station 200. Alternatively, the GPS receiver 300 always uses the SDM broadcast by base station 200.

Each base station in the cellular communication system can have a GPS receiver that extracts the SDM and GPS almanac data from satellites visible to the base station for broadcast to mobile terminals in range of the base station. Alternatively, the SDMs and GPS almanac data may be extracted at a single regional site, and then relayed to the base stations in the region to be incorporated into their common broadcast channel.

A separate broadcast channel can continuously broadcast the SDM and GPS almanac data. Alternatively, that data can be broadcast periodically on a common broadcast channel. In a GSM cellular communication system, which is one type of system in which the hybrid position determination system can be used, the common broadcast channel is the BCCH channel. The BCCH channel can be used to broadcast the SDM and GPS almanac data. Because a GSM telephone normally receives and decodes the BCCH in its 'on' state, the GSM telephone would therefore acquire the SDMs of its in view GPS satellites as a byproduct of its connectivity to the GSM network. Thus, a mobile terminal that incorporates a GSM telephone, a well-known device for two-way communication using a wireless GSM cellular network, and a GPS receiver has the ability to rapidly acquire all in view satellites. It also has the ability to use the GPS data for the vector delay lock loop to accurately and robustly track GPS satellites even if they are obscured from view and the satellite signal is available only intermittently.

Other types of cellular communication networks can be used to transmit the SDMs and GPS almanac data. For example, third generation (3G) cellular systems such as cdma2000, WCDMA and UWC-136 also have common broadcast channels that can be used to broadcast SDMs to all telephones in their networks, as described above for GSM systems.

Use of Vector Delay Lock Loop with Embedded Navigation Beacons

It is possible to embed navigation beacons within the same spectrum of the communication system that may be received by the mobile terminals, and yet do not interfere with network communications. In this aspect of the invention the base station not only transmits the SDM data in its common broadcast channel, but it also synthesizes a navigation beacon signal that is embedded in the communications signal. Such embedding may be a distinct signal, such as a low power spread spectrum signal occupying the spectrum used by multiple GSM channels, or it may be a specifically designated network communications channel separate from the other communications channels. In either case the channel includes a frequency and timing reference, such as a CDMA channel with improved frequency and timing so that it can support precise positioning by mobile terminals. According to this aspect of the invention the mobile terminal may determine its position from only GPS signals, only network navigation beacons, or from a combination of each.

Figure 8:
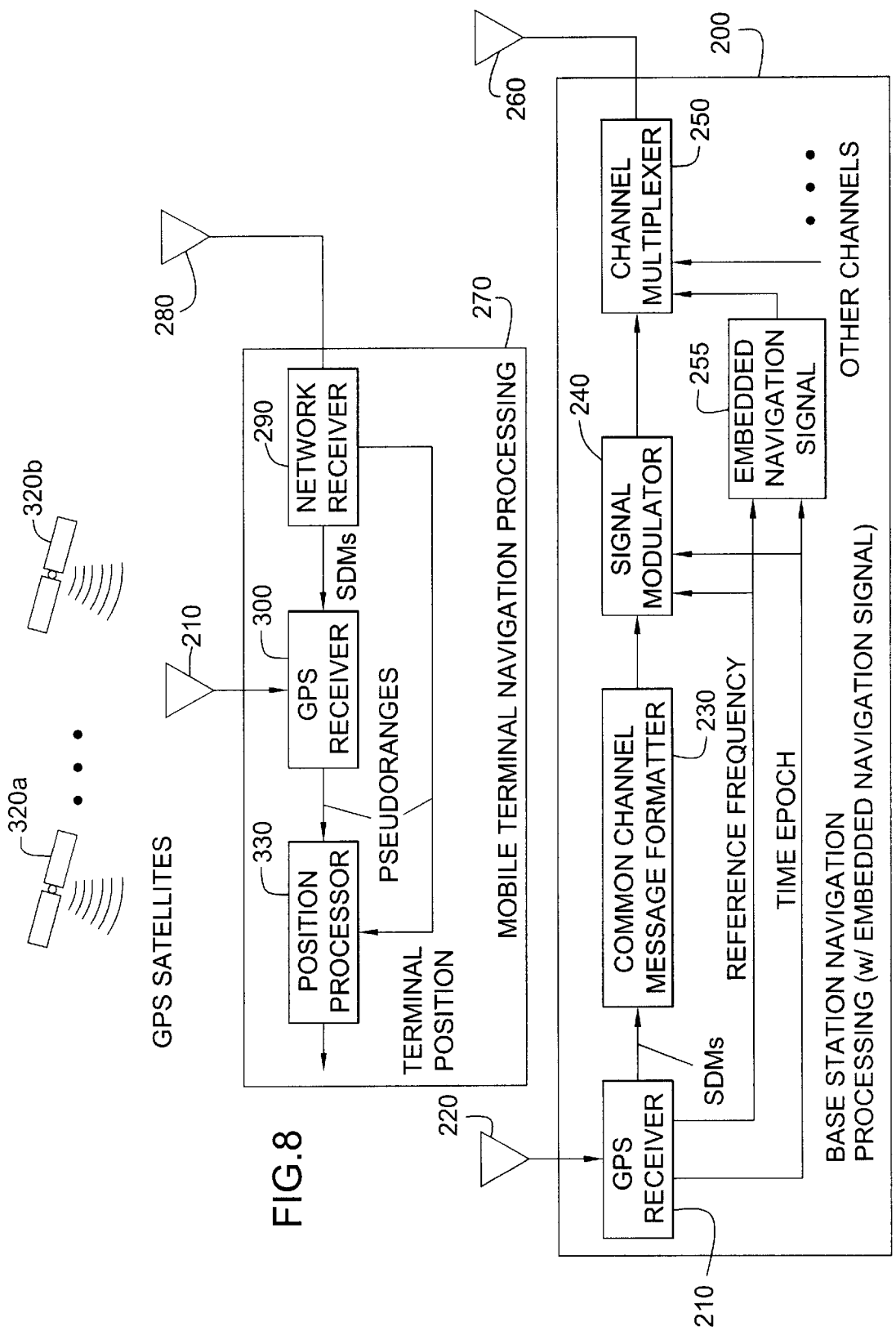
FIG. 8 is a schematic diagram of a hybrid position determination system using cellular communications signals as navigation signals.

FIG. 8 illustrates a hybrid position determination that includes all the elements of the system shown in FIG. 7, but provides for additional navigation beacons that are transmitted by the base stations 200 of a cellular network. In the system shown in FIG. 7, the GPS receiver 210 is connected to a GPS antenna 220 for receiving the GPS satellite signals. Here the GPS receiver 210 provides time and frequency references to an embedded navigation signal unit 255. The time and frequency references are generated based on the GPS signals received from the GPS satellites, and allow the embedded navigation signal unit 255 to control the frequency and timing of the signals broadcast by the base station to correspond to the frequency and timing in the GPS system.

The embedded navigation beacon may be a signal separate from the communications signals, such as a spread spectrum signal over multiple 200 kHz GSM channels. Alternatively, the embedded navigation signal may be a communications signal broadcast with improved frequency and timing precision so that it may serve as a navigation beacon. In either case, the embedded navigation signal is included in the signals multiplexed by broadcast channel multiplex unit 250.

The network receiver 290 in the mobile terminal 270 receives the embedded navigation signals and makes measurements on them (i.e., pseudo-range measurements) that can be used by a position processor 330 to determine the mobile terminal's position. Such position determination can rely solely upon the measurements of the embedded signals, or may combine the measurements of the network receiver 290 and the GPS receiver 300.

APPLICATIONS

The mobile terminal position systems and methods according to the aspects of the invention described here are useful for a variety of applications, including the following.

Position Dependent Billing: With a mobile terminal that is able to determine its position, the terminal can alert the user which zone it is in and the resulting cost of making a call from that zone.

E911 Service: When the mobile terminal makes a 911 call, it relays its pre-determined position within the message overhead of the call. The position is then captured by the cellular service provider and relayed to the Public Service Access Provider (PSAP) that services the E911 service. In this way, the PSAP is immediately informed of the position of the emergency.

Position Dependent Yellow Pages: When a mobile terminal makes a call to a Yellow Pages' service provider, the cellular service provider captures the terminal position and relays it to the Yellow Pages service provider. The Yellow Pages service provider can then provide position dependent service information (e.g., the location of the nearest ATM, open gas station, etc.).

Smart Antennas: A cellular service provider, with knowledge of a mobile terminal's position, can control a "smart" antenna to form a beam in the direction of the mobile terminal being served. The mobile terminal once it determines its position using the techniques described here can send to the cellular service provider position information estimating its position. The provider would then use that position information to form a beam to better communicate with the mobile terminal.

Having described preferred embodiments of a hybrid position determination system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of determining a range between a first navigation source transmitting a first navigation signal and a mobile unit configured for use in a communication network, the method comprising:

receiving a second navigation signal transmitted from a second navigation source;

receiving from the communication network a data message having information concerning the first navigation source, the data message being transmitted through the communication network; and determining a range between the first navigation source and the mobile unit by using a vector delay lock loop unit that determines the range based on the second navigation signal received from the second navigation source and the information in the data message received from the communications network.

2. The method of claim 1, further comprising intermittently receiving the first navigation signal and determining the range based on the intermittently received first navigation signal.

3. The method of claim 1, wherein the data message is received from a broadcast channel of a two-way wireless communication network.

4. The method of claim 1, wherein the communication network is a cellular communication network.

5. The method of claim 4, wherein the cellular communications network is a GSM cellular communication network and the broadcast channel is the BCCH channel of the GSM network.

6. The method of claim 4, wherein the broadcast channel is a common broadcast control channel of one of a cdma2000 cellular communication network, a WCDMA cellular communication network, and a UWC-136 cellular communication network.

7. The method of claim 1, wherein the second navigation source is a ground-based navigation source.

8. The method of claim 7, wherein the ground-based navigation source is a base station in a wireless communication system.

9. The method of claim 8, wherein the base station transmits the second navigation signal using a frequency reference controlled based on a frequency reference used by the first navigation source.

10. The method of claim 9, wherein the first navigation source is a spaced-based satellite.

11. The method of claim 1, further comprising determining a position of the mobile unit based on the determined range.

12. The method of claim 11, further comprising altering a user of the mobile unit with information concerning a cost of making a telephone call based on the determined position.

13. The method of claim 11, further comprising including in a message sent from the mobile unit the determined position of the mobile unit.

14. The method of claim 12, further comprising receiving position dependent service information in response to the sent message.

15. A mobile unit for use in a communication network having a communication channel, comprising:

a network receiver configured to receive over the channel a communications signal including a first navigation data message having information concerning a first navigation source; and a navigation receiver comprising a vector delay lock loop (VDLL) unit configured to receive the first navigation data message from the network receiver and a first navigation signal from the first navigation source and a second navigation signal from the second navigation source, and configured to compute a range between the mobile unit and the first navigation source based on the second navigation signal and the first navigation data message.

16. The mobile unit of claim 15, wherein the channel is a broadcast channel of a two-way wireless communication network.

17. The mobile unit of claim 16, wherein the first navigation source is a base station in the wireless communication network.

18. The mobile unit of claim 16, wherein the wireless communication network is a cellular communication network.

19. The mobile unit of claim 18, wherein the channel is a broadcast control channel (BCCH) of a GSM cellular communication network.

20. The mobile unit of claim 18, wherein the channel is a common broadcast control channel of one of a cdma2000 cellular communication network, a WCDMA cellular communication network, and a UWC-136 cellular communication network.

21. The mobile unit of claim 15, wherein the first navigation source is a Global Positioning System (GPS) satellite.

22. The mobile unit of claim 15, wherein first navigation signal is a navigation beacon embedded within a communication signal in the wireless communication network.

23. The mobile unit of claim 22, wherein the navigation beacon is a low power spread spectrum signal occupying the spectrum used by the communication signal.

24. The mobile unit of claim 22, wherein the channel uses frequency and timing references derived from a navigation system using the second navigation source.

25. The mobile unit of claim 15, wherein the VDLL unit computes the range between the mobile unit and the first navigation source when the mobile unit cannot receive the first navigation signal.

26. The mobile unit of claim 15, wherein the VDLL unit comprises:

a correlator configured to receive the first and second navigation signals and output range measurements for the first and second navigation sources;

a geometry processor configured to receive the first navigation data message and output information concerning the position of the first navigation source;

a weighting unit coupled to the correlator and the geometry processor, and configured to assign weights to the range measurements based on the information output from the geometry processor, and output weighted range measurements; and a range calculation unit coupled to the weighting unit and the geometry processor configured to combine the weighted range measurements based on the information output from the geometry processor, and output a range measurement.

27. A mobile unit for use in a communication network having a channel, comprising:

means for receiving a first navigation signal from a first navigation source and a second navigation signal from a second navigation source;

means for receiving over the channel a communications signal including a first navigation data message having information concerning the first navigation source; and vector delay lock loop means for computing a range between the mobile unit and the first navigation source based on the second navigation signal and the first navigation data message.

* * * * *